United States Patent [19]

Omae et al.

[11] 4,366,420

[45] Dec. 28, 1982

[54] ELECTROMOBILE CONTROL DEVICE

[75] Inventors: Tsutomu Omae; Katsuji Marumoto, both of Hitachi; Shotaro Naito, Katsuta, all of Japan

[73] Assignee: Hitachi, Ltd., Tokyo, Japan

[21] Appl. No.: 109,846

[22] Filed: Jan. 7, 1980

[30] Foreign Application Priority Data

Jan. 12, 1979 [JP] Japan ................................. 54-1328

[51] Int. Cl.$^3$ .............................................. H02P 5/16
[52] U.S. Cl. .................................... 318/338; 318/139; 318/493
[58] Field of Search ........................ 318/338, 493, 139

[56] References Cited

U.S. PATENT DOCUMENTS

| | | | |
|---|---|---|---|
| 3,836,833 | 9/1974 | Harris et al. | 318/270 |
| 3,986,088 | 10/1976 | Zankl et al. | 318/803 |
| 4,037,144 | 7/1977 | Ohmae et al. | 318/338 |
| 4,153,863 | 5/1979 | Schachte et al. | 318/341 |

FOREIGN PATENT DOCUMENTS 663052  5/1979  U.S.S.R. ............................... 318/338

Primary Examiner—David Smith, Jr.
Attorney, Agent, or Firm—Antonelli, Terry & Wands

[57] ABSTRACT

A control device for an electromobile provided with a shunt motor includes a pattern generating means for storing, as patterns, armature and field currents capable of generating an output torque with a minimum loss in the driving system of the electromobile to deliver an armature current command and a field current command for generating a specified output torque on the basis of the patterns, an armature control circuit for supplying the shunt motor with an armature current corresponding to the armature current command, and a field control circuit for supplying the shunt motor with a field current corresponding to the field current command. Thus, the torque control of the shunt motor is conducted on the basis of the patterns, and a computer control is applicable to the above control device.

22 Claims, 21 Drawing Figures

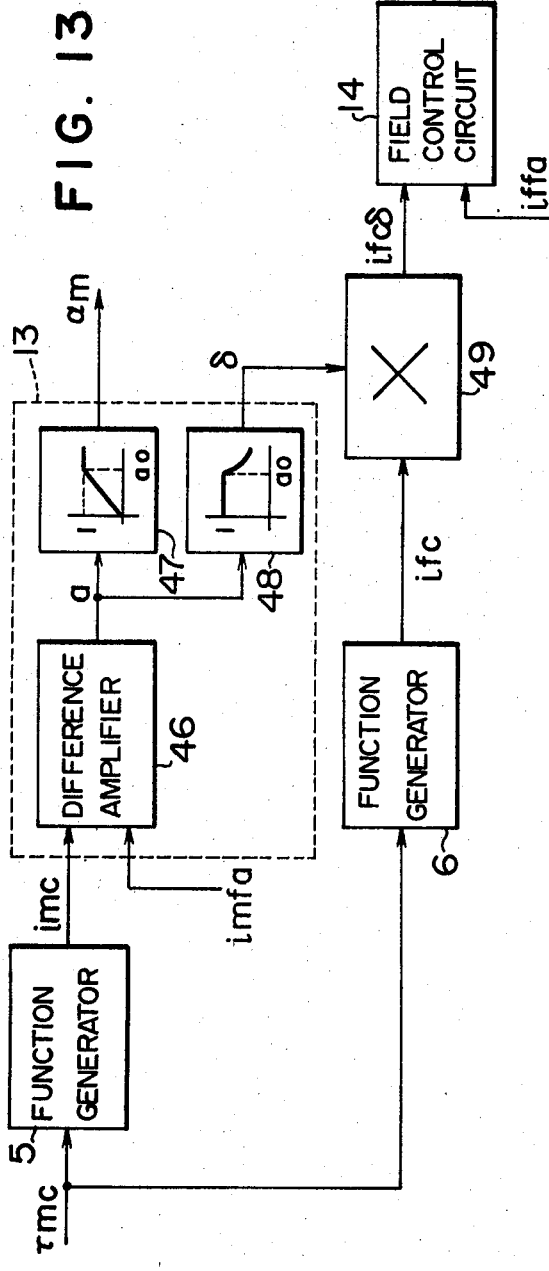
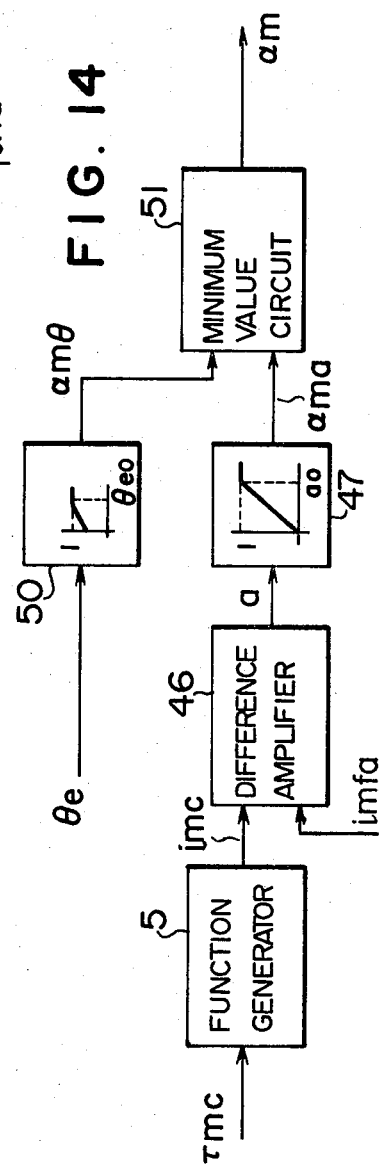
FIG. 13
FIG. 14

ELECTROMOBILE CONTROL DEVICE

The present invention relates to a control device for an electromobile equipped with a shunt motor, and more particularly to a control device for driving a shunt motor by control of the armature and field currents so as to generate at the highest efficiency a motor output torque specified in accordance with the extent to which an accelerator pedal is depressed.

An electromobile uses a storage battery as the power source thereof and is relatively short in travelling distance. Therefore, it is important to reduce losses in the driving system of the electromobile to as great an extent as possible. Further, since the electromobile travels the same road together with the automobile with a gasoline engine, it is required that the electromobile be as easy to operate as the automobile with a gasoline engine. To this end, an electromobile control device has been known in which a shunt motor is employed as the driving motor for the electromobile. For example, a U.S. Pat. No. 4,037,144 discloses a control device for such a shunt motor. In this control device, in order to minimize the total loss in the driving system of the electromobile, the armature current of the shunt motor is detected and the field current thereof is controlled so as to have an optimum value on the basis of the detected value of armature current. However, this device has a drawback that the selected value of field current is affected by a dynamic characteristic of the armature current.

An object of the present invention is to provide an electromobile control device capable of driving a shunt motor at the highest efficiency to generate a selected output torque.

Another object of the present invention is to provide an electromobile control device equipped with a pattern generator for storing, as predetermined patterns, armature and field currents which can drive an electric motor at the highest efficiency to generate an output torque from the electric motor in accordance with the angle of depression of the accelerator pedal of the electromobile.

A further object of the present invention is to provide an electromobile control device which makes use of a microcomputer for driving a shunt motor at its highest efficiency under a selected output torque.

In order to attain the above objects, according to an aspect of the present invention, there is provided a control device for an electromobile provided with a shunt motor comprising: a command unit for generating an output torque command for the shunt motor in accordance with the angle of depression of an accelerator pedal; a pattern generating means for storing, as predetermined patterns, armature and field currents capable of generating an output torque of the shunt motor indicated by the output torque command in such a manner as to produce a minimum loss in the driving system of the electromobile, and for generating an armature current command and a field current command in accordance with the predetermined patterns and the output torque command; armature control means for passing an armature current corresponding to the armature current command through the armature winding of the shunt motor; and field control means for passing a field current corresponding to the field current command through the field winding of the shunt motor.

Further, according to another aspect of the present invention, there is provided a control device for an electromobile provided with a shunt motor comprising: a command means for generating an output torque command of the shunt motor in accordance with the angle of depression of an accelerator pedal; memory means for storing predetermined patterns respectively indicating armature and field currents capable of generating an output torque of the shut motor indicated by the output torque command in such a manner as to produce a minimum loss in the driving system in the electromobile; a microprocessor for calculating an armature current command and a field current command corresponding respectively to the armature and field currents producing the minimum loss, in a predetermined processing order, on the basis of the output torque command and the predetermined patterns, and for delivering the armature current command and the field current command; armature control means for passing an armature current corresponding to the armature current command through the armature winding of the shunt motor; and field control means for passing a field current corresponding to the field current command through the field winding of the shunt motor.

The foregoing and other objects, features and advantages of the present invention will be apparent from the following description taken in conjunction with the accompanying drawing, in which:

FIG. 13 is a block diagram showing a part of a different embodiment of an electromobile control device according to the present invention, which embodiment includes means for conducting a field-weakening control, in addition to the features provided by the circuit arrangement shown in FIG. 1;

FIG. 14 is a block diagram showing a part of an additional embodiment of an electromobile control device according to the present invention, which embodiment includes means for limiting the conduction ratio of a chopper to a maximum value, in addition to the features provided by the circuit arrangement shown in FIG. 1;

Figure 1:
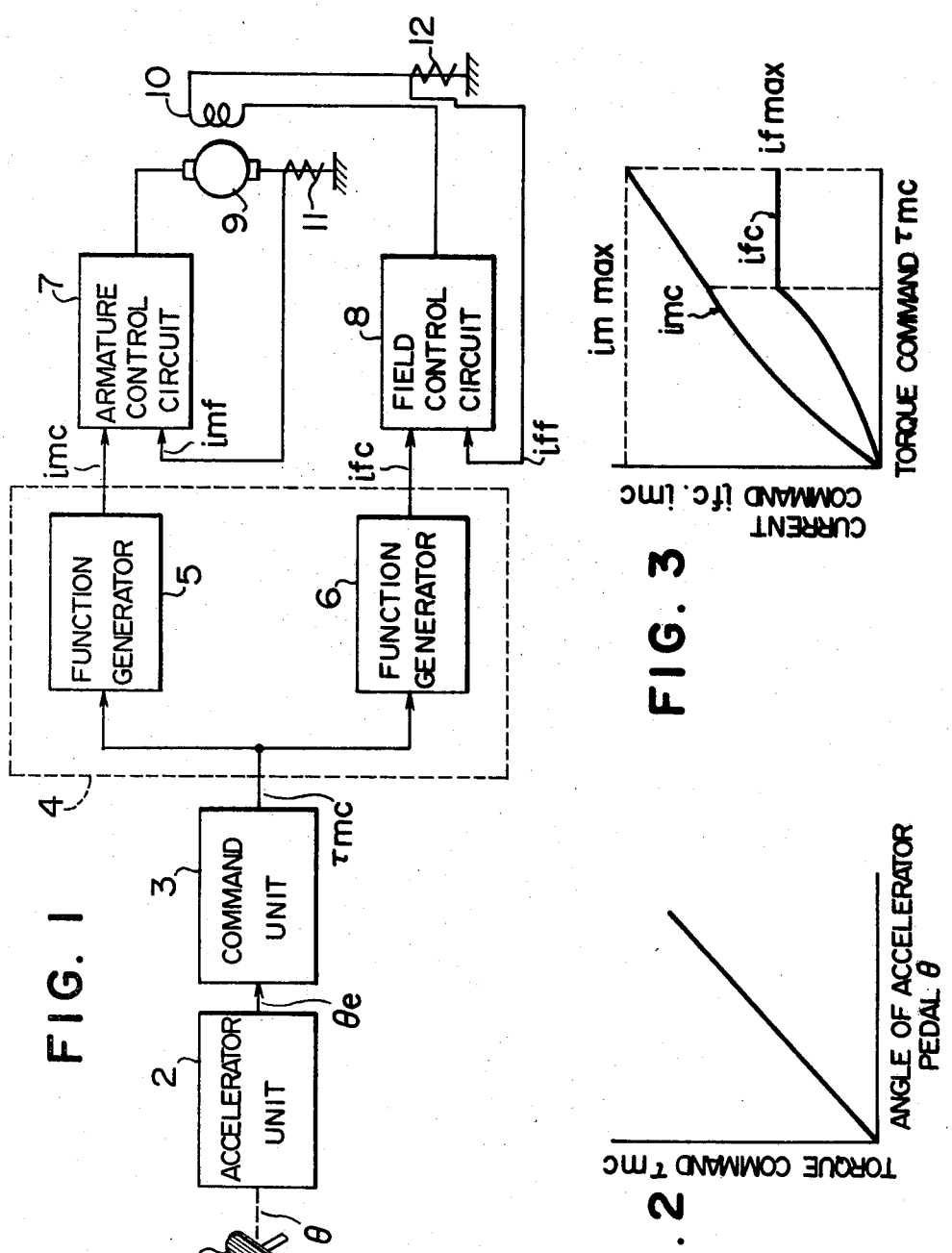
FIG. 1 is a block diagram showing an embodiment of an electromobile control device according to the present invention.

Now, explanation will be made on an embodiment of an electromobile control device according to the present invention. In FIG. 1, one embodiment, of the present invention includes an accelerator pedal 1, an accelerator unit 2 for generating an electric output in accordance with how much the accelerator pedal is depressed, namely, a signal corresponding to an angle $\theta$ of the accelerator pedal, a command unit 3 for generating an output torque command $\tau_{mc}$ of a shunt motor 9 based upon the output $\theta_e$ of the accelerator unit 2, a pattern generating means 4 made up of two function generators 5 and 6 for generating respectively an armature current command $i_{mc}$ and a field current command $i_{fc}$, an armature control circuit 7 for controlling the current flowing through the armature winding of the shunt motor 9, a field control circuit 8 for controlling the current flowing through the field winding 10, and detectors 11 and 12 for detecting armature and field currents, respectively.

Now, the operation of the embodiment shown in FIG. 1 will be explained below.

Figure 2:
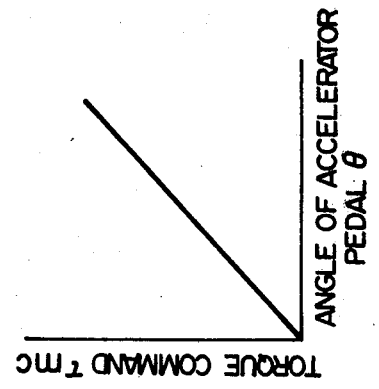
FIG. 2 is a graph showing a relation between an angle $\theta$ of a depressed accelerator pedal and a torque command $\tau_{mc}$.

When the accelerator pedal is depressed, the accelerator unit 2 delivers the electric output $\theta_e$ corresponding to the angle $\theta$ of the accelerator pedal, and the command unit 3 generates the torque command $\tau_{mc}$. For example, there is a relation as shown in FIG. 2 between the angle $\theta$ of accelerator pedal and the torque command $\tau_{mc}$. The output $\tau_{mc}$ of the command unit 3 is applied to the pattern generator 4 made up of the function generators 5 and 6, which generates the armature current command $i_{mc}$ and the field current command $i_{fc}$, respectively. The functions generated in the function generators are determined in the following manner. When the armature current and field currents of the shunt motor are expressed by $i_m$ and $i_f$, respectively, the torque $\tau_m$ of the motor is given by the following equation:

$$\tau_m = k i_m i_f \quad (1)$$

where k denotes a constant.

While, the total loss W in the driving system of the embodiment shown in FIG. 1 is given by the following equation:

$$W = f(i_m, i_f, N) \quad (2)$$

where N denotes the number of rotations of the motor.

Now, let us consider a case where the loss depending upon the number N of rotations is separable from the remaining loss, then, equation (2) can be rewritten in the following manner:

$$W = g_1(i_m, i_f) + g_2(N) \quad (3)$$

Assuming that the output torque is constant, the relation between $i_m$ and $i_f$ at which the total loss W has a minimum value, is obtained experimentally on the basis of the equation (3), and is expressed in the following manner:

$$i_m = g_3(i_f) \quad (4)$$

The following equation is obtained by substituting $g_3(i_f)$ for $i_m$ of equation (1):

$$\tau_m = k \cdot i_f g_3(i_f) \quad (5)$$

When the torque $\tau_m$ is given, the field current $i_f$ is determined by equation (5), and then the armature current $i_m$ is determined by equation (4).

In more detail, for example, the previously-mentioned U.S. Pat. No. 4,037,144 discloses the following empirical equation which expresses the total loss W excepting the loss $g_2(N)$ depending upon the number of rotations.

$$W = k_1 i_m^2 + k_2 i_f^2 + W_c \quad (6)$$

where $W_c$ denotes a constant mechanical loss, and $k_1$ and $k_2$ are constants. Further, in the above patent, the armature and field currents $i_m$ and $i_f$ are given by the following equations:

$$i_m = \sqrt[4]{\frac{k_2 \tau^2}{k_1 k^2}} \quad (7)$$

$$i_f = \sqrt[4]{\frac{k_1 \tau^2}{k_2 k^2}} \quad (8)$$

Thus, armature and field currents which reduce the total loss W to a minimum value, are readily obtained for a constant torque.

The function generator 6 incorporated in the embodiment shown in FIG. 1 delivers an output based upon the relation given by equation (5) or (8) between the field current and the torque, and the function generator 5 delivers an output based upon the relation given by the combination of equations (4) and (5) or equation (7) between the armature current and the torque.

A main feature of the present invention resides in the fact that each of the armature and field currents capable of driving the shunt motor with a minimum loss for an output torque command is stored in each of the function generators (5) and (6) in the form of a predetermined pattern.

Figure 3:
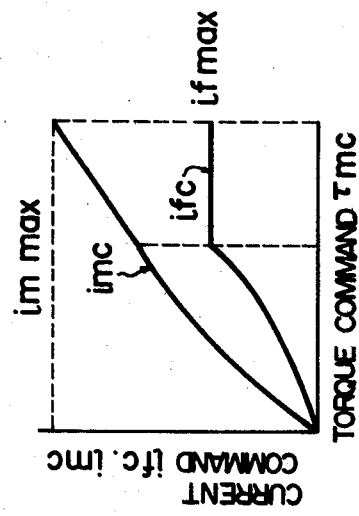
FIG. 3 is a graph showing relations between a torque command $\tau_{mc}$ and current $i_{fc}$ and $i_{mc}$ based upon predetermined patterns.

FIG. 3 shows an example of each of the functions stored in the function generators (5) and (6). As is seen in FIG. 3, a maximum current at which field saturation takes place, is indicated by $i_{fmax}$, and only the armature current $i_{mc}$ is increased within a range of torque requiring the maximum field current.

Figure 4:
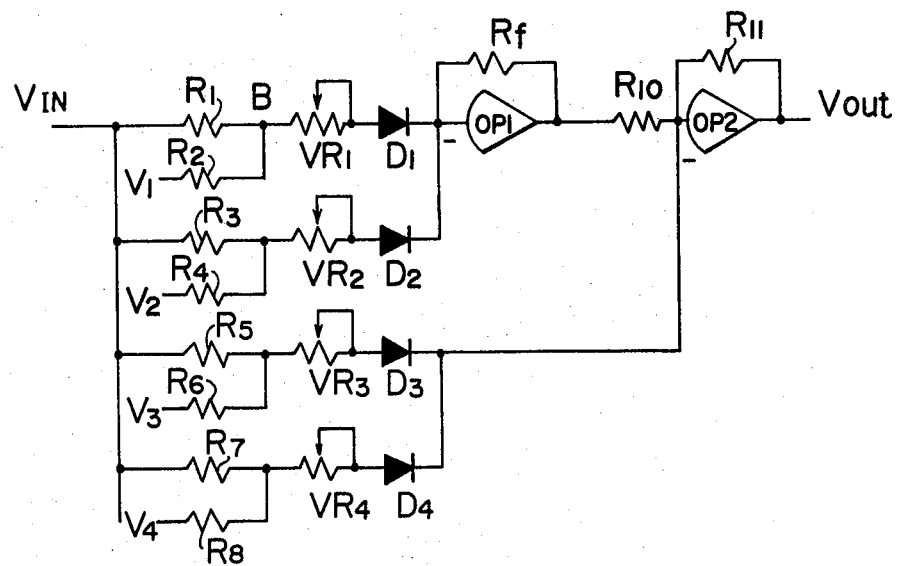
FIG. 4 is a circuit diagram for showing an example of a function generator used in the present invention.

Although the function generators satisfying the above relations between the armature and field currents and the output torque can be readily formed by those skilled in the art, an example thereof is shown in FIG. 4.

Figure 5:
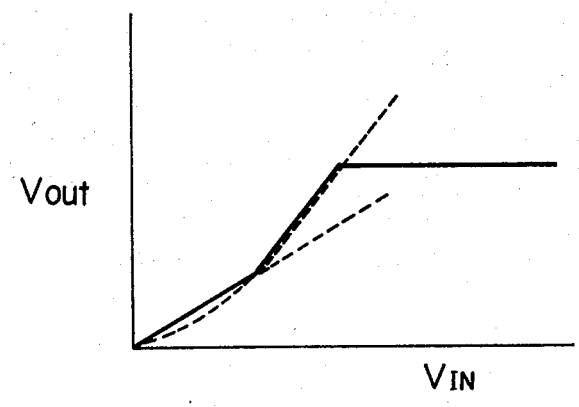
FIG. 5 is a graph showing an input-output characteristic of the function generator shown in FIG. 4.

In FIG. 4, reference symbols $V_1$ to $V_4$ designate reference voltages, OP1 and OP2 designate operational amplifiers, $V_{IN}$ is an input signal corresponding to $\tau_{mc}$, and $V_{OUT}$ is an output signal corresponding to $i_{mc}$ or $i_{fc}$. The circuit shown in FIG. 4 can produce, for example, the input-output characteristic shown in FIG. 5 when appropriate circuit constants are employed.

Figure 6:
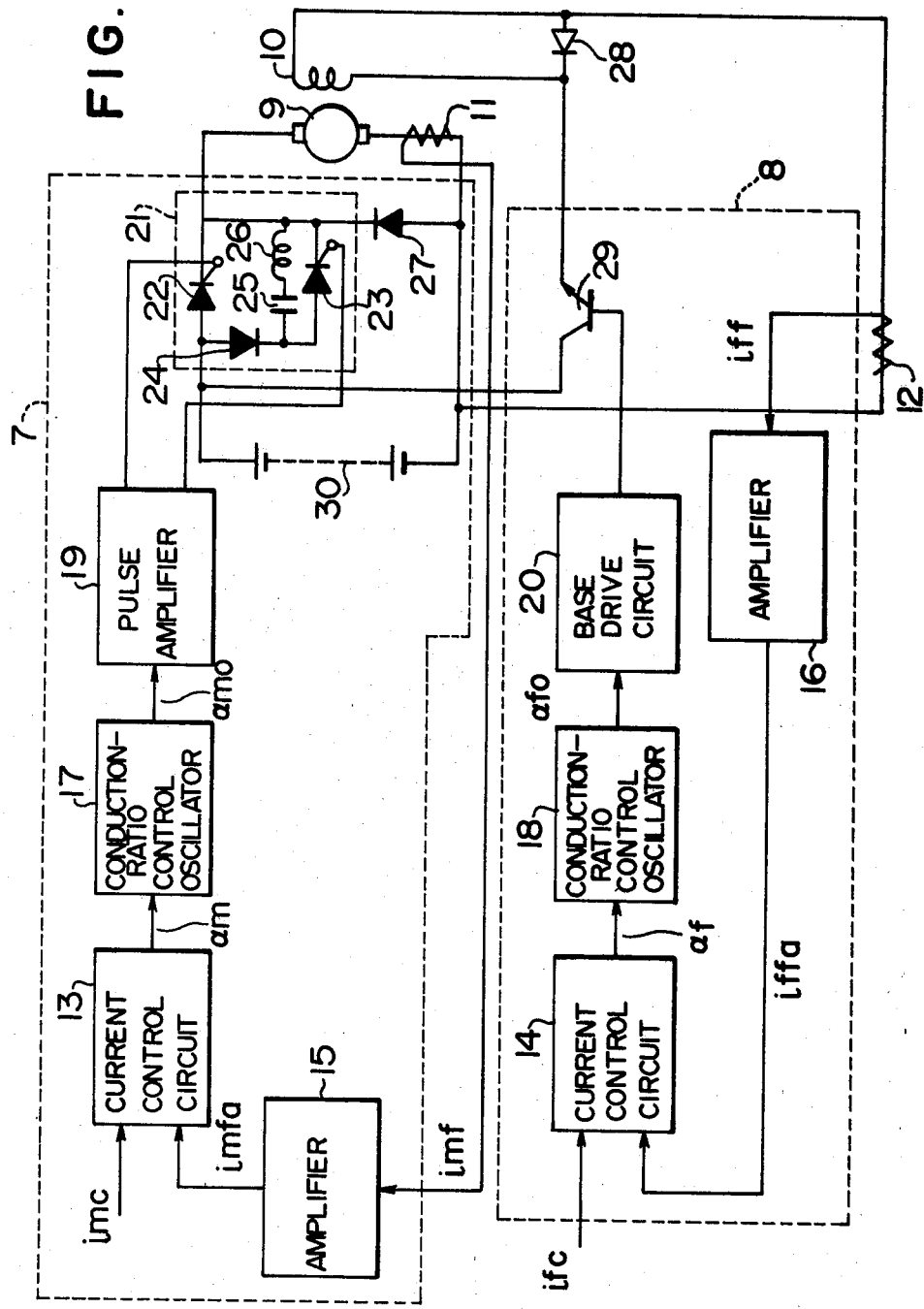
FIG. 6 is a block diagram showing both the armature control circuit and the field control circuit which are included in the embodiment shown in FIG. 1.

Next, the armature control circuit 7 and the field control circuit 8 which are shown in FIG. 1, will be explained below in detail by reference to FIG. 6. In FIG. 6, a current control circuit 13 for producing an armature current corrsponding to an armature current command $i_{mc}$, from both the command $i_{mc}$ and an amplified signal $i_{mfa}$, through a feedback control, an amplifier 15 for amplifying a detected current signal $i_{mf}$ to deliver the amplified signal $i_{mfa}$, a conduction-ratio control oscillator 17 for defining the conduction ratio of a thyristor chopper 21 in accordance with the output of the current control circuit 13, a pulse amplifier 19 for amplifying the output signal $\alpha_{mo}$ of the oscillator 17, a storage battery 30 serving as a power source, thyristors 22 and 23, a diode 24, commutation capacitor 25, a commutation reactor 26, and a fly-wheel diode 27.

Similarly, the field control circuit 8 includes a current control circuit 14, a conduction-ratio control oscillator 18, a base drive circuit 20 for a transistor 29, an amplifier 16, a fly-wheel diode 28, and the transistor 29, and supplies a field winding 10 with a field current corresponding to a field current command $i_{fc}$.

Figure 7:
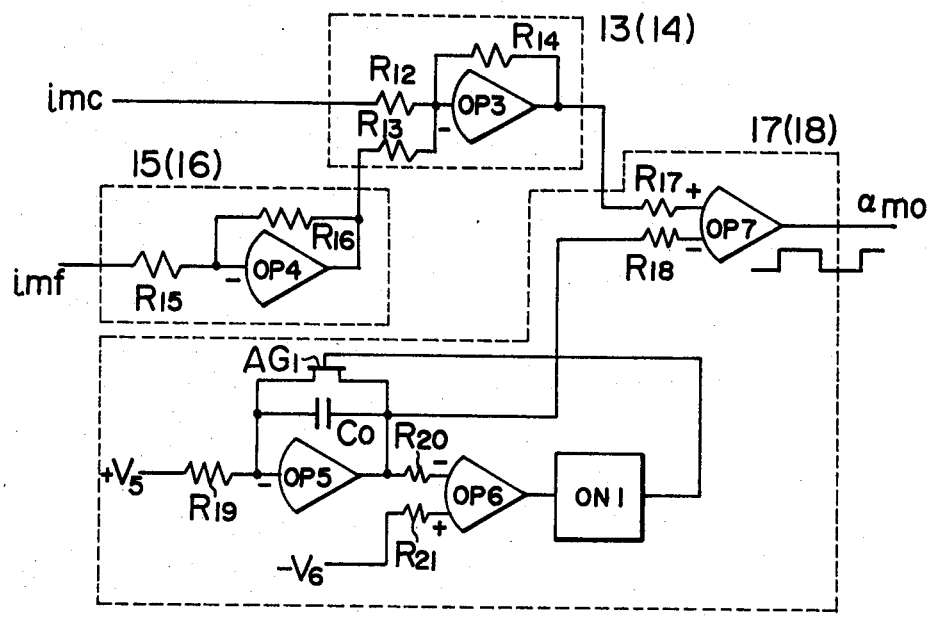
FIG. 7 is a circuit diagram for showing an example of the armature control circuit shown in FIG. 6.
Figure 8:
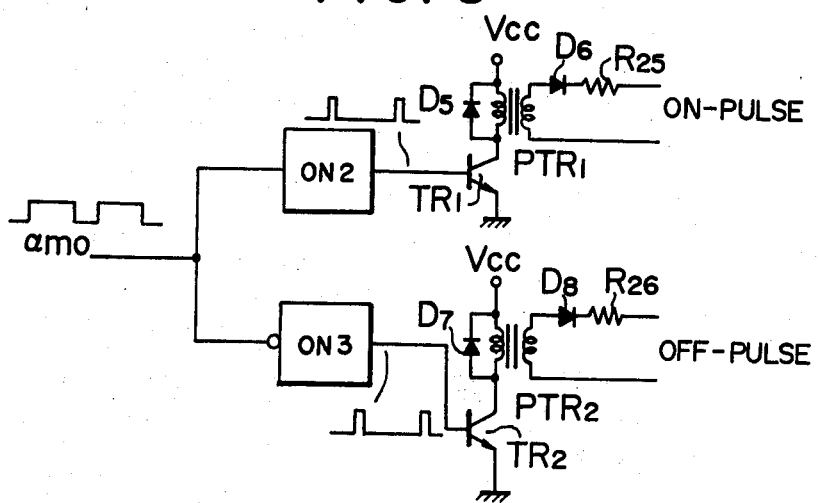
FIG. 8 is a circuit diagram for showing an example of the pulse amplifier shown in FIG. 6.

A circuit arrangement of the part which includes the amplifier 15 (or 16), the current control circuit 13 (or 14) and the conduction-ratio control oscillator 17 (or 18), is shown in FIG. 7, and an example of the pulse amplifier 19 is shown in FIG. 8. In FIGS. 7 and 8, reference symbols OP3 to OP7 designate operational amplifiers, and ON1 to ON3 monostable circuits.

The armature current command $i_{mc}$ delivered from the function generator 5 and the output signal $i_{mf}$ of the armature current detector 11 are processed in the circuits shown in FIGS. 7 and 8 to deliver from the amplifier 19 an on-pulse and an off-pulse each for controlling the thyristors 22 and 23. The current control circuit 14, the conduction-ratio control oscillator 18 and the amplifier 16 which are included in the field control circuit 8, may have the same circuit construction as those shown in FIG. 7. Accordingly, the field current command $i_{fc}$ delivered from the function generator 6 and the output signal $i_{ff}$ of the field current detector 12 are processed in a similar manner, and thus an appropriate field current is supplied to the field winding.

In the above-mentioned embodiment, an armature current and a field current which can drive a shunt motor with a minimum loss, are independently selected by the pattern generator 4 on the basis of an output torque command corresponding to the angle of the accelerator pedal. Accordingly, the shunt motor can be driven at its highest efficiency.

Figure 9:
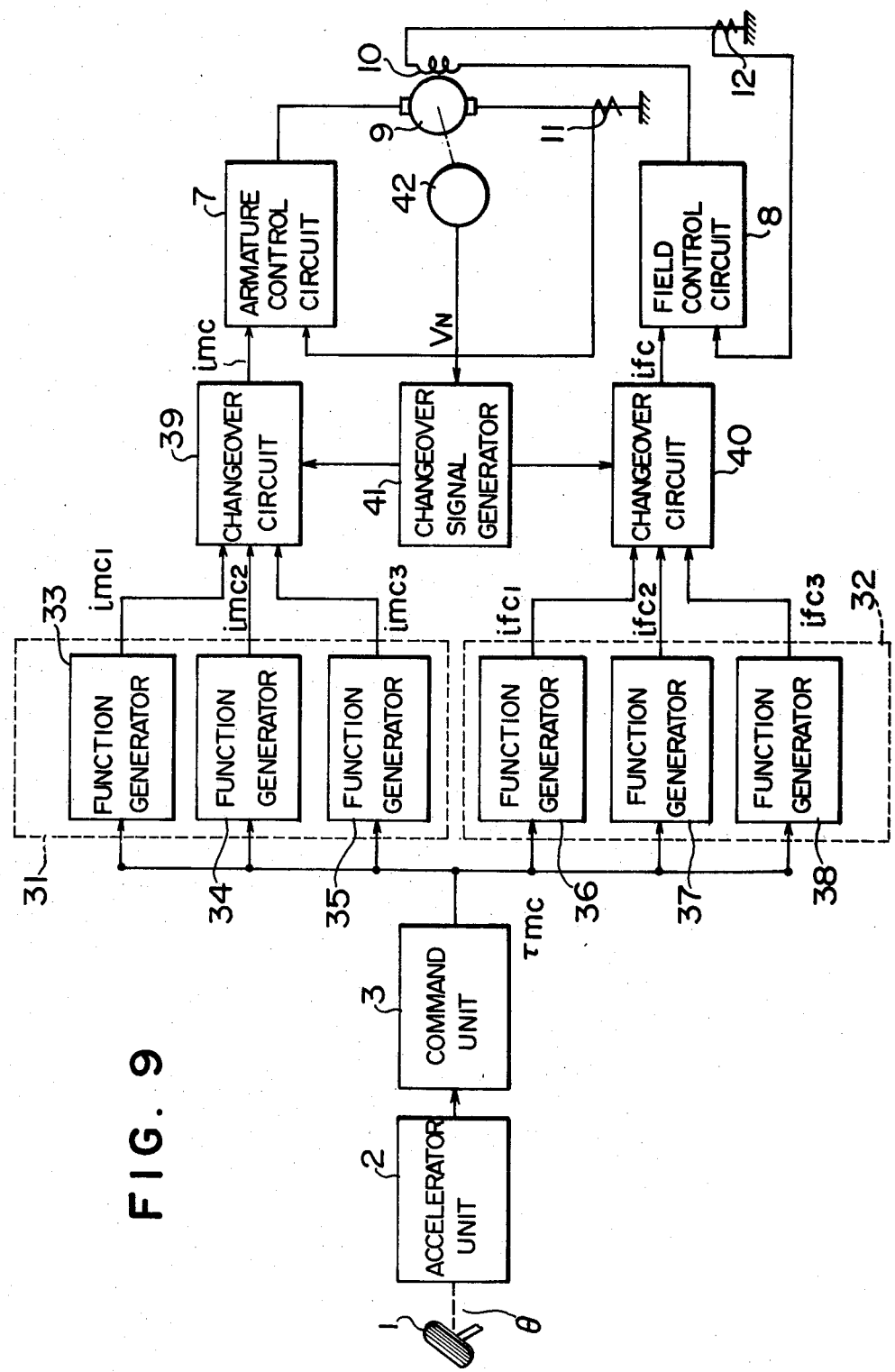
FIG. 9 is a block diagram showing another embodiment of an electromobile control device according to the present invention.

FIG. 9 shows another embodiment of an electromobile control device according to the present invention. The embodiment shown in FIG. 1 is used in a case where equation (2) can be converted into equation (3). In fact, there is a case where the loss depending upon the number of rotations cannot be separated. In such a case, information on the number of rotations of the motor has to be considered in the pattern generating means. FIG. 9 shows one embodiment applicable to this case. Referring to FIG. 9, a pattern generating means 31 for generating the armature current command includes function generators 33, 34 and 35, and another pattern generating means 32 for generating the field current command includes function generators 36, 37 and 38. Further, the embodiment shown in FIG. 9 includes a changeover circuit 39 for selecting one of the outputs $i_{mc1}$, $i_{mc2}$ and $i_{mc3}$ of the function generators 33, 34 and 35, a changeover circuit 40 for selecting one of the outputs $i_{fc1}$, $i_{fc2}$ and $i_{fc3}$ of the function generators 36, 37 and 38, a changeover signal generator 41 for generating a changeover signal, and a tachometer generator 42. The function generators 33 and 36 store functions which can drive a shunt motor 9 with a minimum loss when the motor 9 is low in the number of rotations, the function generators 34 and 37 are used when the motor 9 is intermediate in the number of rotations, and the function generators 35 and 38 store functions capable of driving the motor 9 with a minimum loss when the number of rotations is high. In other words, the pattern generating means 31 and 32 include three sets of functions corresponding to three ranges of the number of rotations of the motor 9. A function set in each of the function generators 33 to 38 is determined on the basis of a predetermined pattern, and each function generator may have the same circuit construction as shown in FIG. 4.

Figure 10:
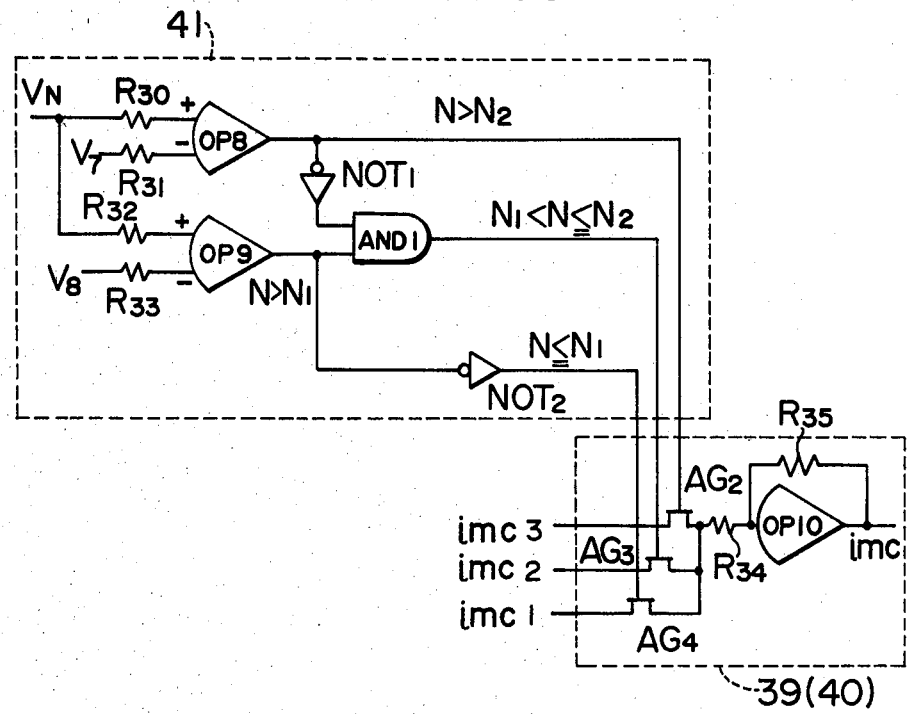
FIG. 10 is a circuit diagram for showing an example of that circuit part of the embodiment shown in FIG. 9 which includes the changeover circuit and the changeover signal generator.

FIG. 10 shows examples of the changeover signal generator 41 and changeover circuit 39 (or 40). The changeover signal generator 41 shown in FIG. 10 includes resistors $R_{30}$, $R_{31}$, $R_{32}$ and $R_{33}$, operational amplifiers OP8 and OP9, NOT circuits NOT 1 and NOT 2, and an AND circuit AND 1. The output voltage $V_N$ of the tachometer generator 42 is applied through the resistor $R_{30}$ to the positive input terminal of the operational amplifier OP 8 to be compared with a constant voltage $V_7$ which corresponds to the number of rotations of the motor equal to $N_2$. Accordingly, the output of the operational amplifier OP 8 is put to the level of "1" when the number N of rotations is greater than $N_2$. The output voltage $V_N$ is also applied to the operational amplifier OP 9 to be compared with a constant voltage $V_8$ which corresponds to the number of rotations equal to $N_1$. The output of the operational amplifier OP 9 assumes the level of "1" when the number N of rotations is greater than $N_1$. One input of AND circuit AND 1 is received through the NOT circuit NOT 1 from the output of the operational amplifier OP 8, and the other input is directly received from the output of the operational amplifier OP 9. Accordingly, the output of the AND circuit AND 1 assumes the level of "1" when the number N of rotations satisfies a relation $N_1 < N \leq N_2$. Further, the output of the operational amplifier OP 9 is applied to the NOT circuit NOT 2, and therefore the NOT circuit NOT 2 delivers output signal having the level of "1" when the number N of rotations satisfies a relation $N \leq N_1$.

The changeover circuit 39 (or 40) shown in FIG. 10 includes analog gates AG2, AG3 and AG4, resistors $R_{34}$ and $R_{35}$ and an operational amplifier OP10. When the number N of rotations is greater than $N_2$, the gate AG2 becomes conductive and the input $i_{mc3}$ is applied to the operational amplifier OP 10 through the resistor $R_{34}$ to form the current command $i_{mc}$. Similarly, the gate AG3 or AG4 becomes conductive when the relation $N_1 < N \leq N_2$ or $N \leq N_1$ is satisfied. Thus, the input $i_{mc2}$ or $i_{mc1}$ is applied to the operational amplifier OP 10 to form the current command $i_{mc}$.

The torque command $\tau_{mc}$ has a constant value so long as the angle $\theta$ of the accelerator pedal is kept constant.

In such a state, when the tachometer generator 42 detects that the shunt motor 9 is low in the number of rotations, the output of the changeover signal generator 41 operates the changeover circuits 39 and 40 so as to form the armature current command $i_{mc}$ and the field current command $i_{fc}$ by the output $i_{mc1}$ of the function generator 33 and the output $i_{fc1}$ of the function generator 36, respectively. As a result, an armature current and a field current are employed which can drive the shunt motor 9 with a minimum loss in a range of number of rotations which includes the number of rotations now used.

As mentioned above, the embodiment shown in FIG. 9 takes the number of rotations of the motor into consideration, and can drive the motor 9 by a combination of armature and field currents which produces a minimum loss, even in such a case that equation (2) cannot be converted into equation (3).

Figure 11:
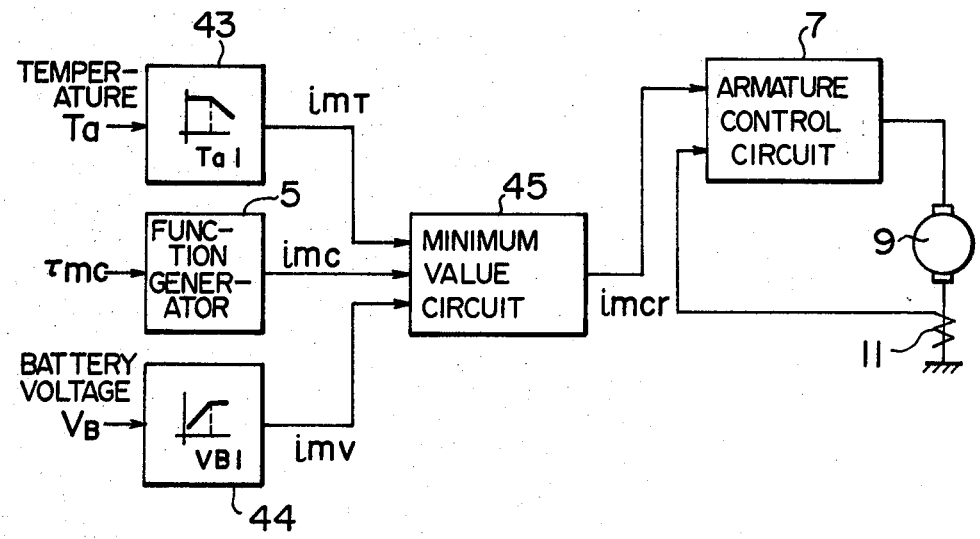
FIG. 11 is a block diagram showing a part of a further embodiment of an electromobile control device according to the present invention, which embodiment includes protection means in addition to the circuit arrangement shown in FIG. 1.

FIG. 11 shows, in block form, a part of a further embodiment of an electromobile control device according to the present invention. Since this embodiment is different only in the part for determining the armature current command from the embodiment shown in FIG. 9, only this part is shown in FIG. 11. In more detail, in the embodiment shown in FIG. 11, the function of detecting the temperature of the shunt motor or the control device in order to protect them and the function of protecting a storage battery when the voltage thereof is decreased, are added to the embodiment shown in FIG. 1. When the temperature of the driving system of the electromobile becomes high, or when the voltage of the storage battery is decreased, the armature current is usually made small to protect the driving system and the battery. The embodiment shown in FIG. 11 is applicable to such a case.

Figure 12:
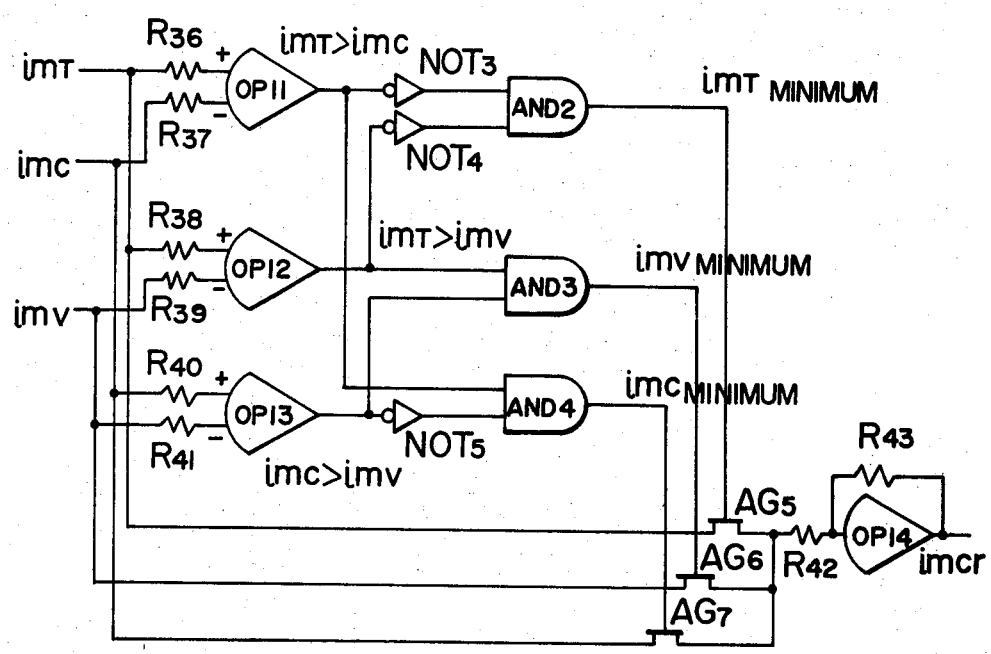
FIG. 12 is a circuit diagram for showing an example of the minimum value circuit shown in FIG. 11.

Referring to FIG. 11, the function set in the function generator 43 has such a form as shown in a block indicated by reference numeral 43. That is, the output $i_{mT}$ of the function generator 43 is decreased as the temperature $T_a$ of the motor 9 becomes higher in a temperature range exceeding a predetermined temperature $T_{a1}$. Further, the function set in the function generator 44 has such a form as shown in a block 44. That is, the function generator 44 delivers a constant output $i_{mV}$ when the battery voltage $V_B$ is increased to a voltage range exceeding a predetermined voltage $V_{B1}$. The outputs $i_{mT}$, $i_{mc}$ and $i_{mV}$ are applied to a minimum value circuit 45. FIG. 12 shows an example of the circuit construction of the minimum value circuit 45. The smallest one of the outputs $i_{mT}$, $i_{mc}$ and $i_{mV}$ is selected by the circuit 45, and is applied to the armature control circuit 7 to pass a desired current through the armature winding of the shunt motor 9. In other words, the outputs $i_{mT}$ and $i_{mV}$ are used as limit signals for limiting the armature current.

According to the above embodiment, the armature current is reduced, when the temperature of the shunt motor becomes high, and when the battery voltage is decreased. Thus, the safety of the electromobile can be enhanced.

FIG. 13 shows a part of a different embodiment of an electromobile control device according to the present invention. This embodiment includes means for performing field-weakening control in addition to the functions performed by the circuit construction shown in FIG. 1. In more detail, the current control circuit 13 (such as shown in FIG. 6) of this embodiment is made up of a difference amplifier 46 and function generators 47 and 48. As is shown in blocks 47 and 48, the function generator 47 delivers a constant output when the output a of the amplifier 46 is increased to a range exceeding a predetermined value $a_o$, and the output of the function generator 48 is decreased as the output a of the amplifier 46 becomes greater in a range exceeding the value $a_o$. A multiplier 49 multiplies the output $i_{fc}$ of the function generator 6 by the output $\delta$ of the function generator 48 to apply the product $i_{fc} \cdot \delta$ to the field control circuit 14.

As the number of rotations of the motor becomes higher in a state where both the output $i_{mc}$ of the function generator 5 and the conduction-ratio $\alpha_m$ of chopper are kept constant, the counter electromotive force of the motor is increased and the current $i_{mfa}$ is decreased. As a result, the output a of the amplifier 46 is increased and therefore the output of the function generator 47, namely, the conduction ratio $\alpha_m$ of the chopper is increased. When the output a of the amplifier 46 reaches the value $a_o$, the conduction ratio $\alpha_m$ becomes equal to 1, that is, the chopper is always kept in the conductive state. After this time, the output $\delta$ of the function generator 48 is decreased, and therefore the actual field current command $i_{fc} \cdot \delta$ is also decreased. As a result, the output $\alpha_f$ of the field control circuit 14 is decreased. Thus, the field-weakening control is conducted in driving the motor at a high speed. As is apparent from the above, a high-speed driving system including the field-weakening control feature can be readily added to the embodiment shown in FIG. 1.

Further, there is a case in which the maximum torque is limited in accordance with the angle of accelerator pedal. FIG. 14 shows an example of a circuit arrangement applicable to such a case. The circuit shown in FIG. 14 includes a function generator 50 and a minimum value circuit 51 in addition to the circuit configuration shown in FIG. 13. The output $\alpha_{m\theta}$ of the function generator 50 is increased as the output $\theta_e$ of the accelerator unit becomes greater in a range below a predetermined value $\theta_{eo}$. The outputs of the function generators 50 and 47 are applied to the minimum value circuit 51, and therefore the output $\alpha_m$ of the circuit 51 is limited to $\alpha_{m\theta}$ even when the output $\alpha_{ma}$ of the function generator 47 is greater than $\alpha_{m\theta}$. The output characteristic of the function generator 50 which is described above and shown in a block 50, merely shows an example of the function stored in the function generator 50, and any desired function can be readily formed by those skilled in the art. Since the circuit construction of the minimum value circuit 51 is well known in the art, the explanation thereof is omitted for brevity's sake.

The above embodiment can prevent the shunt motor 9 from being driven at a high speed when the accelerator pedal is slightly trodden, and thus can improve the drive feeling of the electromobile.

Figure 15:
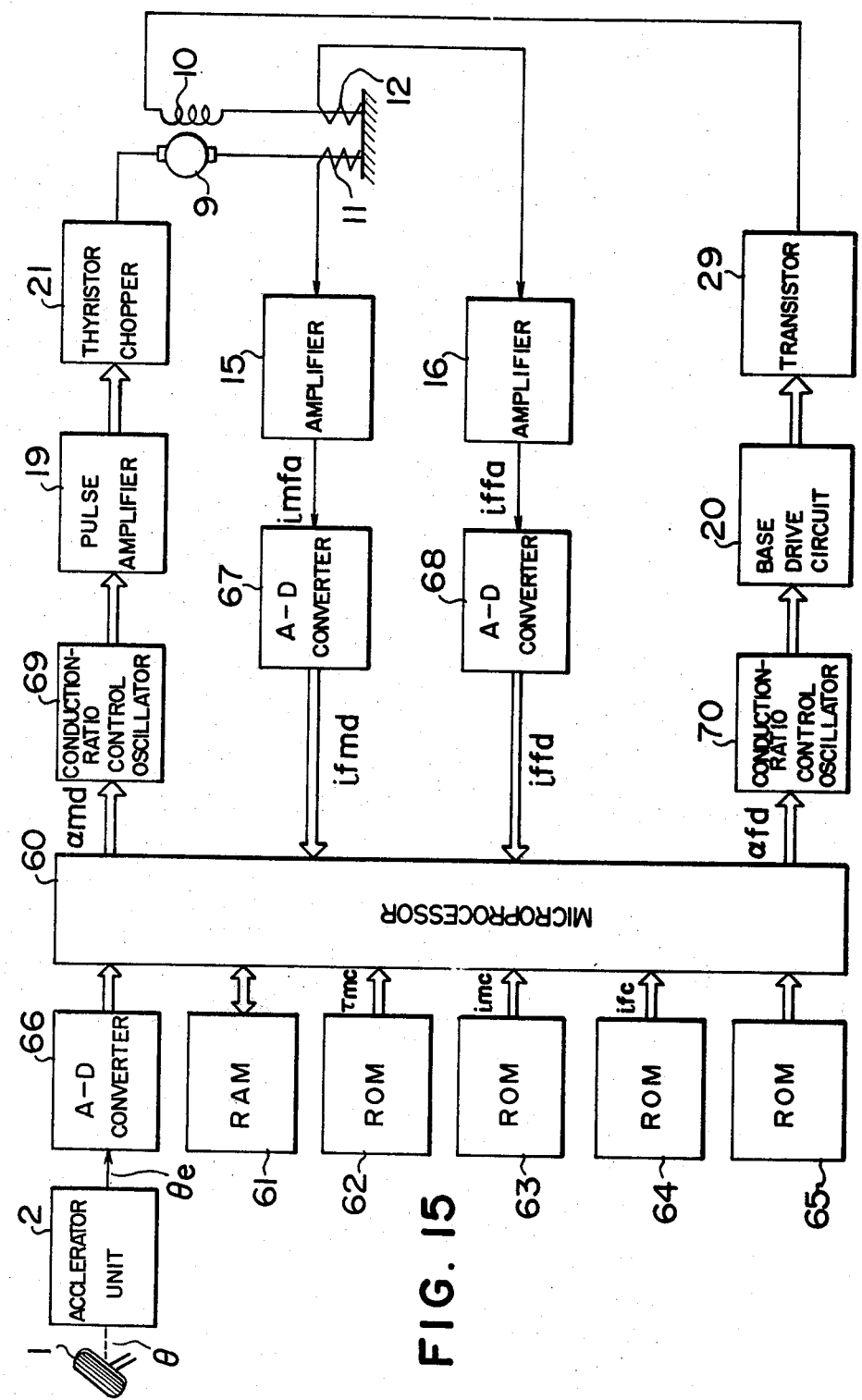
FIG. 15 is a block diagram showing still another embodiment of an electromobile control device according to the present invention, which embodiment employs a microprocessor.

FIG. 15 shows still another embodiment of an electromobile control device according to the present invention, which employs a microprocessor 60 as a control unit. The blocks indicated by like reference numerals have the same functions as those shown in FIGS. 1 and 6. Referring to FIG. 15, the output of an accelerator unit 2 is converted by an analog-digital converter 66 into a digital signal, which is applied to a microprocessor 60. Further, reference numeral 61 designates a random access memory (RAM) for temporarily storing data, 62 a read only memory (ROM) for storing the relation shown in FIG. 2, 63 a ROM for storing the relation shown in FIG. 3 between $i_{mc}$ and $\tau_{mc}$, 64 a ROM for storing the relation shown in FIG. 3 between $i_{fc}$ and $\tau_{mc}$, and 65 a ROM for storing the processing order in the microprocessor 60.

The above embodiment is further provided with such peripheral circuits as a conduction-ratio control oscillator 69 for generating on- and off-pulses of a thyristor chopper in accordance with the conduction-ratio command $\alpha_{md}$ delivered from the microprocessor 60, an analog-digital converter 67 for converting the output of an amplifier 15 into a digital signal, another conduction-ratio control oscillator 70 for generating a square wave having a conduction width (or pulse width) in accordance with the conduction-ratio command $\alpha_{fd}$ delivered from the microprocessor 60 to turn on a transistor 29, and another analog-digital converter 68 for converting the output of another amplifier 16 into a digital signal.

Figure 16:
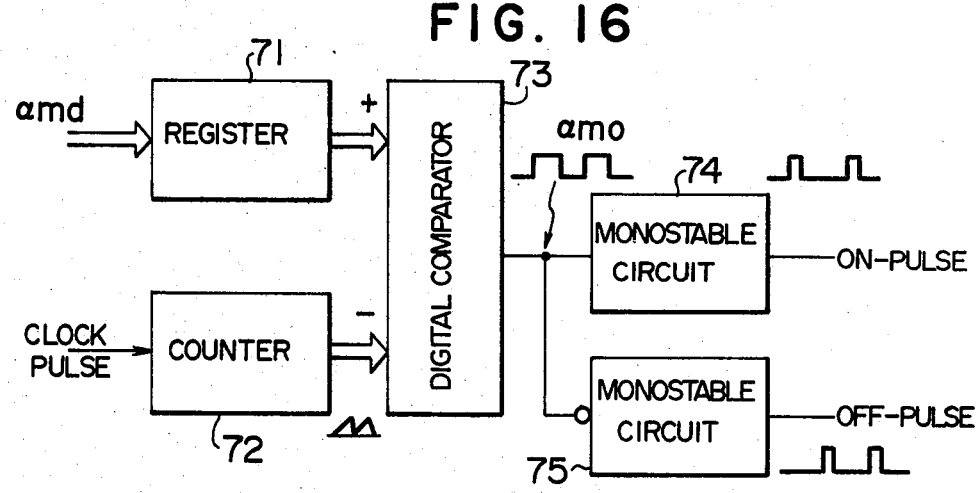
FIG. 16 is a block diagram showing one conduction-ratio control oscillator shown in FIG. 15.
Figure 17:
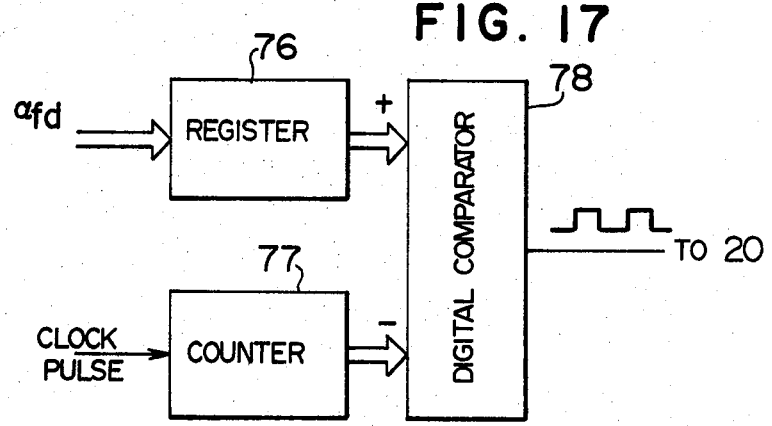
FIG. 17 is a block diagram showing the other conduction-ratio control oscillator shown in FIG. 15.

Each of the conduction-ratio control oscillators 69 and 70 is made up of only digital elements, as shown in FIGS. 16 and 17. In more detail, the conduction-ratio control oscillator 69, as is shown in FIG. 16, includes a register 71, a counter 72, a digital comparator 73, and monostable circuits 74 and 75. The conduction-ratio command $\alpha_{md}$ from the microprocessor 60 is set in the register 71. While, the counter 72 receives a pulse train having a predetermined frequency, so that the contents of the counter 72 is repeatedly increased from zero to a maximum value. The output of the digital comparator 73 assumes the level of "1" or the level of "0" according to whether the value set in the register 71 is greater than the contents of the counter 72 or not. Thus, the digital comparator 73 delivers a square wave signal. The square wave signal is applied to the monostable circuits 74 and 75, which deliver an on-pulse synchronized with the rising time of the square wave signal and an off-pulse synchronized with the falling time of the square wave signal, respectively. The on-pulse and the off-pulse form signals for turning on and off the thyristor chopper, respectively.

The conduction-ratio control oscillator 70 shown in FIG. 17 includes a register 76, a counter 77 and a digital comparator 78, and delivers a square wave signal, which has a duty factor corresponding to the conduction-ratio command $\alpha_{fd}$ and forms a signal for controlling the base voltage of the transistor 29.

Figure 21:
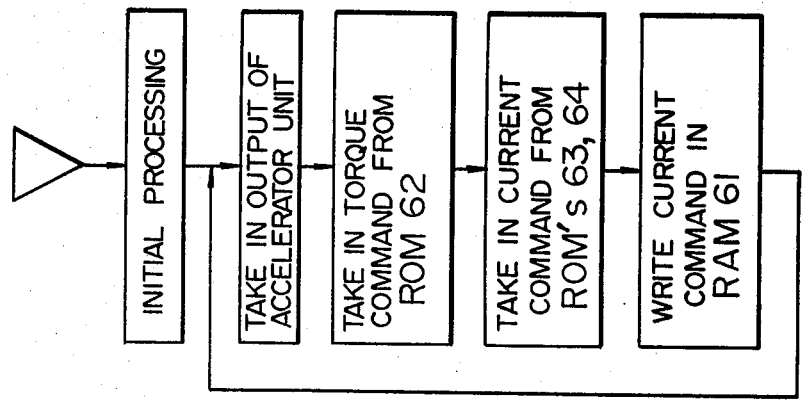
FIGS. 19 to 21 are flow charts for explaining the command generation processing, field-current control processing and armature-current control processing, respectively. In the drawings, like reference numerals refer to like parts.
Figure 20:
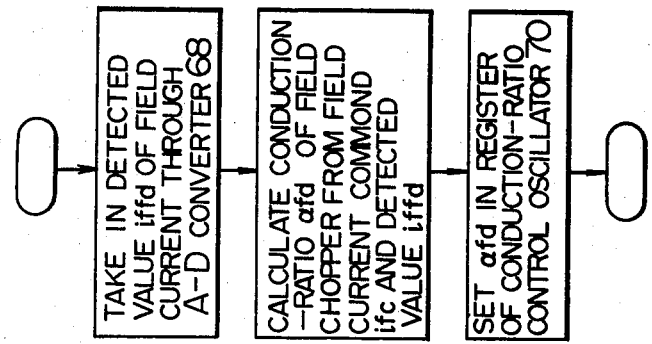
Figure 19:
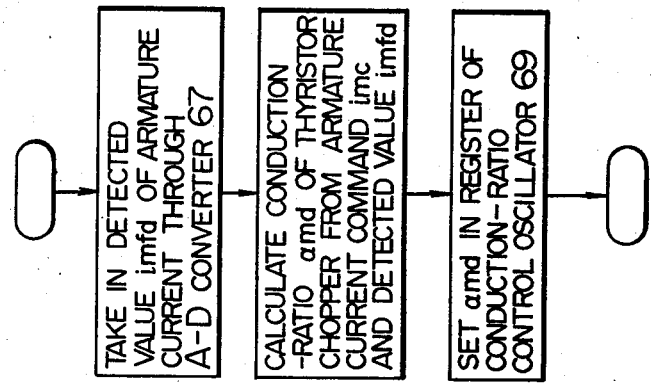

The ROM 65 stores therein the procedure for processing the contents shown in FIGS. 19 to 21. Every processing in the flow chart shown in FIG. 19 is always conducted when no interrupt is generated. That is, the field current command and the armature current command are generated in accordance with the output of the accelerator unit 2. The flow chart in FIG. 20 shows the processing of an interrupt which is carried out at intervals of $T_1$, that is, the field-current control processing. The flow chart in FIG. 21 shows the processing of another interrupt carried out at intervals of $T_o$, that is, the armature-current control processing. This processing is conducted in preference to the field-current control processing.

Figure 18:
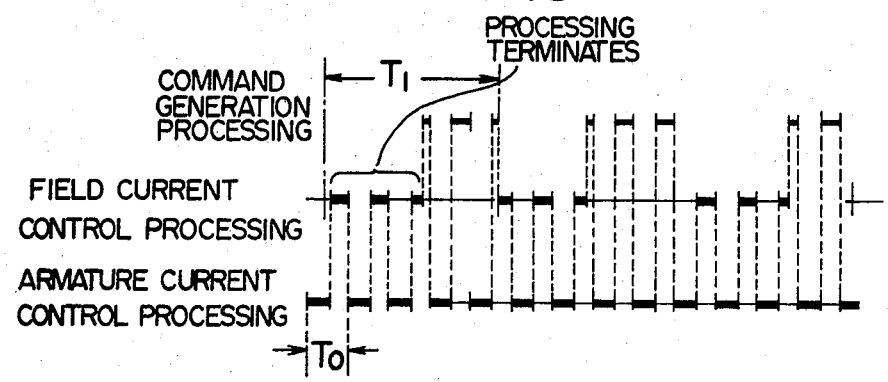
FIG. 18 is a time chart for explaining the processing made by the microprocessor shown in FIG. 15.

Now, explanation will be made on the control operation by reference to the time chart shown in FIG. 18 and to the flow charts shown in FIGS. 19 to 21.

When the microprocessor 60 is supplied with a supply voltage, the processing indicated by the flow chart in FIG. 19 is first conducted. At first, an initial processing is conducted. In this processing, the interrupt is first inhibited, both the armature current command and the field current command are made equal to zero, and then the interrupt inhibit is cancelled. Subsequently, the command generation processing is conducted. That is, the microprocessor 60 takes in the angle $\theta$ of accelerator pedal through the analog-digital converter 66, and takes in the contents of the ROM 62 specified by an address corresponding to the above-mentioned value of $\theta$, that is, a desired torque command $\tau_{mc}$. Next, the microprocessor 60 takes in the contents of each of the ROM's 63 and 64 specified by an address corresponding to the above-mentioned $\tau_{mc}$. The derived contents are stored as the armature current command $i_{mc}$ and the field current command $i_{fc}$ in the RAM 61 serving as the working area. In the command generation processing, the above process from the detection of $\theta$ to the generation of the current command is repeated.

When the interrupt for controlling the field current is generated in the above state, the field current control processing in the flow chart shown in FIG. 20 is carried out. In this processing, the microprocessor 60 takes in the field current value $i_{ffd}$ which is detected by the detector 12 and then amplified by the amplifier 16, through the analog-digital converter 68, subsequently reads out the field current command $i_{fc}$ stored in the RAM 61, and then conducts the following calculation:

$$\left.\begin{array}{ll} \alpha_{fd} = k_f(i_{fc} - i_{ffd}) & \text{when } i_{fc} \geqq i_{ffd}, \\ \alpha_{fd} = 0 & \text{when } i_{fc} < i_{ffd} \end{array}\right\} \quad (9)$$

The conduction-ratio command $\alpha_{fd}$ (for the field current chopper) thus obtained is set in the register 76 of the conduction-ratio control oscillator 70. Thus, the oscillator 70 delivers a square wave signal having a conduction ratio of $\alpha_f$, which controls the transistor 29 through the base drive circuit 20 to pass a desired current through the field winding 10. With the above operation, the field current is made nearly equal to the field current command.

A similar operation is performed in the armature current control system. Since the response of armature current is generally rapid as compared with that of the field current, the period $T_o$ for controlling the armature current is made shorter than the period $T_I$ for controlling the field current, and the interrupt for armature current control is carried out in preference to that for field current control.

When the interrupt for controlling the armature current is generated, the microprocessor 60 performs the armature current control processing in the flow chart shown in FIG. 21. The armature current control processing is carried out in the same manner as the field current control processing. That is, the conduction-ratio command $\alpha_{md}$ for the armature current chopper is calculated from the armature current command $i_{mc}$ and the output $i_{mfd}$ of the analog-digital converter 67 by using an equation similar to equation (9), and is set in the register 71 of the conduction-ratio control oscillator 69. Thus, the thyristor chopper 21 repeatedly conducts an on-off operation having a conduction-ratio of $\alpha_m$ to pass an armature current nearly equal to the armature current command $i_{mc}$ through the motor 9.

The embodiment shown in FIG. 15 is simple in construction since the relations shown in FIGS. 2 and 3 are merely stored in the ROM's 62 to 64, and moreover can be provided with desired characteristics by using other ROM's in place of the ROM's 62 to 64.

Needless to say, the embodiment shown in FIG. 15 can store various patterns of armature and field currents which have been explained in connection with FIG. 9.

Further, it will be evident to those skilled in the art that the embodiment shown in FIG. 15 can be readily provided with the protective function shown in FIG. 11, the function of conducting the field-weakening control shown in FIG. 13, and the function of controlling the maximum torque shown in FIG. 14.

What we claim is:

1. A control device for an electromobile provided with a shunt motor comprising:
   command means for generating an output torque command for said shunt motor in accordance with the angle of depression of an accelerator pedal;
   pattern generating means for storing, as predetermined patterns, plural pairs of values of armature and field currents capable of generating an output torque of said shunt motor indicated by said output torque command in such a manner as to produce a minimum loss in the driving system of said electromobile, and including means for generating an optimum armature current command and an optimum field current command in accordance with said predetermined patterns and said output torque command;
   armature control means for passing an armature current corresponding to said armature current command through the armature winding of said shunt motor; and
   field control means for passing a field current corresponding to said field current command through the field winding of said shunt motor, said field control means being operative independent of said armature control means.

2. An electromobile control device according to claim 1, wherein said pattern generating means includes a function generator for generating said armature current command and a function generator for generating said field current command.

3. An electromobile control device according to claim 1, wherein said pattern generating means includes a plurality of pattern generators providing patterns which are different from each other in dependence upon the number of rotations of said shunt motor.

4. An electromobile control device according to claim 1 further comprising minimum value means for comparing said armature current command with an armature current limiting signal defined to protect said shunt motor and said control device for said electromobile, and means for supplying the smaller of said armature current command and said armature current limiting signal, as said armature current command, to said armature control means.

5. An electromobile control device according to claim 1 further comprising means for reducing said field current command when a voltage developed across said armature winding of said shunt motor has a maximum value.

6. An electromobile control device according to claim 1 wherein said command means includes an accelerator unit for generating an output in accordance with the angle of depression of the accelerator pedal, and further comprising:
   means responsive to the output of the accelerator unit for reducing said output of the accelerator unit and delivering a reduced output signal when said output of said accelerator unit is smaller than a predetermined value; and
   minimum value means for comparing the output signal of said reducing means with said armature current command, and for supplying the smaller of said output signal and said armature current command, as said armature current command, to said armature control means.

7. A control device for an electromobile provided with a shunt motor comprising:
   command means for generating an output torque command for said shunt motor in accordance with an angle of depression of an accelerator pedal;
   memory means for storing predetermined plural pairs of patterns respectively indicating armature and field currents capable of generating an output torque of said shunt motor indicated by said output torque command in such a manner as to produce a minimum loss in the driving system of said electromobile;
   a microprocessor for delivering an armature current command and a field current command corresponding respectively to said armature and field currents producing said minimum loss, in a predetermined processing order, on the basis of said output torque command and said predetermined patterns;
   armature control means for passing an armature current corresponding to said armature current command through the armature winding of said shunt motor; and
   field control means for passing a field current corresponding to said field current command through the field winding of said shunt motor, said field control means being operative independent of said armature control means.

8. An electromobile control device according to claim 7, wherein said memory means stores a plurality of patterns which are different from each other in dependence upon the number of rotations of said shunt motor.

9. An electromobile control device according to claim 7, wherein said microprocessor is provided with a function of comparing said armature current command with an armature current limiting signal defined to protect said shunt motor and said control device for said electromobile, and a function of supplying the smaller of said armature current command and said armature current limiting signal, as said armature current command, to said armature control means.

10. An electromobile control device according to claim 7, wherein said microprocessor is provided with a function of reducing said field current command when a voltage developed across said armature winding of said shunt motor has a maximum value.

11. An electromobile control device according to claim 7, wherein said microprocessor is provided with a function of producing a reduced signal smaller than an output of an accelerator unit when said output of the accelerator unit is smaller than a predetermined value, a function of comparing said reduced signal with said armature current command, and a function of supplying the smaller of said reduced signal and said armature current command, as said armature current command, to said armature control means.

12. An electromobile control device according to claim 1, wherein said armature current control means is responsive to said armature current command generated by said pattern generating means for controlling said armature current to be supplied to said armature winding of said shunt motor to become equal to a value of said armature current command, and said field current control means being responsive to said field current command generated by said pattern generating means for controlling said field current to be supplied to said field winding of said shunt motor to become equal to a value of said field current command, said field current control means being independent from said armature current control means.

13. A control device for an electromobile provided with a shunt motor comprising:

command means for generating an output torque command for said shunt motor in accordance with the angle of depression of an accelerator pedal;

pattern generating means for storing, as predetermined patterns, values of armature and field currents capable of generating an output torque of said shunt motor indicated by said output torque command in such a manner as to produce a minimum loss in the driving system of said electromobile, and including means for generating an optimum armature current command and an optimum field current command in accordance with said predetermined patterns and said output torque command;

armature control means for passing an armature current corresponding to said armature current command through the armature winding of said shunt motor;

field control means for passing a field current corresponding to said field current command through the field winding of said shunt motor; and means for detecting at least one of an armature current flowing through said armature winding and a field current flowing through said field winding, said detecting means providing an output indicative of the detected value, and said pattern generating means generating said armature current command and said field current command independently of the output of said detecting means, at least one of said armature control means and said field control means being responsive to the associated output of said detecting means.

14. An electromobile control device according to claim 7, wherein said microprocessor is responsive to said output torque command for taking in from said memory means a relationship between said output torque command and said armature current and a relationship between said output torque command and said field current which assure the minimum loss of said driving system of said electromobile and for calculating and for generating said armature current command and said field current command in accordance therewith, said armature control means being responsive to said armature current command for controlling said armature current to be supplied to said armature winding of said shunt motor to become equal to said armature current command, and said field control means being responsive to said field current command for controlling said field current to be supplied to said field winding of said shunt motor to become equal to said field current command, said field control means being independent of said armature control means.

15. A control device for a driving system of an electromobile provided with a shunt motor comprising:

command means for generating an output torque command for said shunt motor in accordance with an angle of depression of an accelerator pedal;

memory means for storing beforehand an output torque command indicating an output torque of said shunt motor, and patterns of an armature current and a field current which produce the output torque of the shunt motor assuring the minimum loss in said driving system of the electromobile; and a microprocessor for, upon receiving said putput torque command, taking in from said memory means a relationship between said output torque command and said armature current and a relationship between said output torque command and said field current which assure the minimum loss in said driving system of the electromobile, in order to calculate and generate an armature current command and a field current command, said microprocessor controlling said armature current to be supplied to an armature winding and said field current to be supplied to a field winding independently to become equal to said armature current command and said field current command, respectively.

16. An electromobile control device according to claim 15, further comprising:

armature current detecting means for detecting the armature current flowing through said armature winding and providing a detected signal in accordance therewith; and armature pulse generating means for comparing said armature current command of said microprocessor with the detected signal of said armature current detecting means to generate a pulse command which causes the armature current to be equal to said armature current command, said pulse command serving to control on and off pulses to be added to a gate of a thyristor which controls the armature current flowing through said armature winding.

17. An electromobile control device according to claim 7 or 12, further comprising:

field current detecting means for detecting the field current flowing through said field winding and providing a detected signal in accordance therewith; and field rectangular wave generating means for comparing said field current command of said microprocessor with a detected signal of said field current detecting means to generate a pulse command which causes the field current to be equal to said field current command, said pulse command serving to generate a rectangular wave to be added to a base of a transistor which controls the field current flowing through said field winding.

18. A control device for an electromobile provided with a shunt motor comprising:

command means for generating an output torque command for said shunt motor in accordance with the angle of depression of an accelerator pedal;

pattern generating means for storing, as predetermined patterns, plural pairs of values of armatures and field currents capable of generating an output torque of said shunt motor indicated by said output torque command in such a manner as to produce a minimum loss in the driving system of said electromobile, and including means for generating an armature current command and a field current command in accordance with said predetermined patterns and said output torque command;

armature control means for passing an armature current corresponding to said armature current command through the armature winding of said shunt motor;

field control means for passing a field current corresponding to said field current command through the field winding of said shunt motor; and means for detecting at least one of the armature current flowing through said armature winding and the field current flowing through said field winding, said detecting means providing an output indicative of the detected value, and said pattern generating means generating said armature current command and said field current command indpendently of the output of said detecting means, at least one of said armature control means and said field control means being responsive to the associated output of said detecting means.

19. An electromobile control device according to claim 18, wherein said pattern generating means includes:

armature function generating means for generating said armature current command in dependence upon the number of rotations of said shunt motor;

field function generating means for generating said field current command in dependence upon the number of rotations of said shunt motor;

said armature current command and said field current command being independent of each other.

20. An electromobile control device according to claim 18, further comprising armature current limiting means for comparing said armature current command with an armature current limiting signal defined to protect said shunt motor and said control device for said electromobile, and for supplying the smaller of said armature current command and said armature current limiting signal as said armature current command to said armature control means.

21. An electromobile control device according to claim 18, further comprising field-weakening control means for reducing said field current command when a voltage across said armature winding of said shunt motor has a maximum value.

22. An electromobile control device according to claim 18, further comprising maximum torque control means for producing a reduced signal smaller than an output of an accelerator unit when said output of the accelerator unit is smaller than a predetermined value, and for comparing said reduced signal with said armature current command, and for supplying the smaller of said reduced signal and said armature current command, as said armature current command, to said armature control means.

* * * * *